(12) United States Patent
Wata et al.

(10) Patent No.: US 9,490,479 B2
(45) Date of Patent: Nov. 8, 2016

(54) NON-AQUEOUS ELECTROLYTE BATTERY

(71) Applicant: PANASONIC CORPORATION, Osaka (JP)

(72) Inventors: Toshie Wata, Osaka (JP); Tadayoshi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 14/378,930

(22) PCT Filed: Mar. 19, 2013

(86) PCT No.: PCT/JP2013/001871
§ 371 (c)(1),
(2) Date: Aug. 14, 2014

(87) PCT Pub. No.: WO2013/140791
PCT Pub. Date: Sep. 26, 2013

(65) Prior Publication Data
US 2015/0017540 A1 Jan. 15, 2015

(30) Foreign Application Priority Data

Mar. 22, 2012 (JP) .................................. 2012-065011

(51) Int. Cl.
*H01M 4/13* (2010.01)
*H01M 4/134* (2010.01)
(Continued)

(52) U.S. Cl.
CPC .............. *H01M 4/483* (2013.01); *H01M 4/13* (2013.01); *H01M 4/131* (2013.01); *H01M 4/134* (2013.01);
(Continued)

(58) Field of Classification Search
CPC .... H01M 4/483; H01M 4/131; H01M 4/134; H01M 4/386; H01M 4/485; H01M 4/13; H01M 4/62; H01M 2004/021; Y02E 60/122
See application file for complete search history.

(56) References Cited

U.S. PATENT DOCUMENTS

| | | | | | |
|---|---|---|---|---|---|
| 5,370,950 | A | * | 12/1994 | Kageyama | H01M 2/0272 429/232 |
| 5,795,680 | A | * | 8/1998 | Ikeda | H01M 2/0222 429/235 |

(Continued)

FOREIGN PATENT DOCUMENTS

| | | |
|---|---|---|
| JP | 2007-157704 A | 6/2007 |
| JP | 2009-170428 A | 7/2009 |
| WO | 2007-055276 A1 | 5/2007 |

OTHER PUBLICATIONS

Machine translation of Japanese Patent Document JP 07-226231 A, published Aug. 22, 1995.*
International Search Report issued in PCT/JP2013/001871, dated Jun. 11, 2013, with English translation.

*Primary Examiner* — Carlos Barcena
*Assistant Examiner* — Lilia V Nedialkova
(74) *Attorney, Agent, or Firm* — McDermott Will & Emery LLP

(57) ABSTRACT

Provided is a non-aqueous electrolyte battery excellent in initial static characteristics and continuous charge characteristics. The non-aqueous electrolyte battery includes a pellet-shaped positive electrode, a pellet-shaped negative electrode, a separator interposed between the positive and negative electrodes, and a non-aqueous electrolyte. The positive electrode includes a positive electrode active material, aluminum powder, a conductive agent, and a binder. The positive electrode active material contains vanadium pentoxide. The positive electrode has a porosity of 35.6 to 45.4 vol %. The negative electrode includes a negative electrode active material containing silicon, a conductive agent, and a binder.

7 Claims, 1 Drawing Sheet

(51) Int. Cl.
  *H01M 4/38* (2006.01)
  *H01M 4/48* (2010.01)
  *H01M 4/62* (2006.01)
  *H01M 4/131* (2010.01)
  *H01M 4/485* (2010.01)
  *H01M 4/02* (2006.01)

(52) U.S. Cl.
  CPC ............ *H01M 4/386* (2013.01); *H01M 4/485* (2013.01); *H01M 4/62* (2013.01); *H01M 2004/021* (2013.01); *Y02E 60/122* (2013.01)

(56) References Cited

U.S. PATENT DOCUMENTS

| | | | |
|---|---|---|---|
| 2006/0051664 A1* | 3/2006 | Tasai | H01M 2/266 429/161 |
| 2007/0072084 A1* | 3/2007 | Nishie | H01M 4/13 429/324 |
| 2010/0124702 A1* | 5/2010 | White | H01M 4/131 429/217 |
| 2010/0151321 A1 | 6/2010 | Yamamoto et al. | |

* cited by examiner

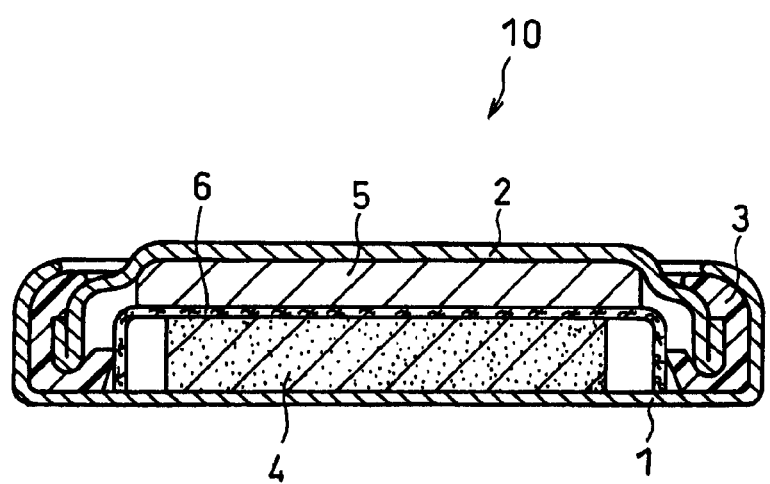

NON-AQUEOUS ELECTROLYTE BATTERY

RELATED APPLICATIONS

This application is the U.S. National Phase under 35 U.S.C. §371 of International Application No. PCT/JP2013/001871, filed on Mar. 19, 2013, which in turn claims the benefit of Japanese Application No. 2012-065011, filed on Mar. 22, 2013, the disclosures of which Applications are incorporated by reference herein.

TECHNICAL FIELD

The present invention relates to a non-aqueous electrolyte battery which includes a positive electrode including vanadium pentoxide, and a negative electrode including silicon.

BACKGROUND ART

Non-aqueous electrolyte batteries represented by lithium ion batteries are widely used as main power source and memory backup power source in various electronic devices. Particularly in recent years, the demand for non-aqueous electrolyte batteries shows an increasing trend year by year, with increase of small portable devices such as cellular phones, digital still cameras, and wireless communication devices. While the reduction in size and weight of the devices proceeds, more functionality and increase in memory capacity are required for the devices. Therefore, in applications such as main power source and memory backup power source, the batteries are required to be small in size and have a high capacity. In addition, in such applications, it is important to ensure excellent reliability over a long period of time.

With regard to the positive electrode active material of non-aqueous electrolyte batteries, for example, manganese dioxide and graphite fluoride are used in primary batteries; in secondary batteries, the use of sulfides such as $TiS_2$ and $MoS_2$, oxides such as manganese dioxide and vanadium pentoxide ($V_2O_5$), and lithium-containing transition metal composite oxides such as lithium cobalt oxide, lithium nickel oxide, and lithium manganese oxide is examined. Vanadium pentoxide can absorb and release lithium ion, and has a high theoretical capacity. Non-aqueous electrolyte batteries in which a positive electrode including vanadium pentoxide is combined with a lithium negative electrode, due to their small self-discharge, are used for backup and other purposes.

For example, Patent Literature 1 discloses using a positive electrode including vanadium pentoxide and aluminum powder, and a negative electrode including niobium pentoxide doped with lithium, in lithium secondary batteries used for backup or power supply to portable devices.

CITATION LIST

Patent Literature

[PTL 1] Japanese Laid-Open Patent Publication No. Hei 7-226231

SUMMARY OF INVENTION

Technical Problem

When used for backup or other similar purposes, the batteries are very frequently charged, and are likely to fall in an overcharged state. If the overcharged state continues, the battery characteristics tend to deteriorate. Therefore, when used for such purposes, the batteries are required to have excellent continuous charge characteristics, that is, to show little deterioration in battery characteristics even after continuous charge.

The charge potential of vanadium pentoxide is high. Therefore, in an overcharged state, the positive electrode is exposed to an extremely high potential. As the potential at the positive electrode becomes higher, vanadium pentoxide is oxidized and leaches out into the non-aqueous electrolyte, causing a side reaction at the negative electrode. This facilitates the deterioration in battery characteristics. In the case where a battery including a positive electrode including vanadium pentoxide is used for backup or other similar purposes where the battery is highly likely to be overcharged, it is particularly desired to ensure excellent continuous charge characteristics for improving the battery reliability.

In Patent Literature 1, aluminum powder is added to the positive electrode including vanadium pentoxide, for the purpose of suppressing the reduction in capacity of the battery when overcharged in a high temperature atmosphere. This may be effective to some extent in improving continuous charge characteristics. However, in the case of forming a positive electrode into a pellet shape using vanadium pentoxide, as compared with using other positive electrode active materials, the porosity tends to increase. When the positive electrode has a high porosity, the supply speed of non-aqueous electrolyte to the positive electrode becomes very fast, which in turn slows the supply speed to the negative electrode.

In non-aqueous electrolyte batteries, the use of negative electrodes including graphite and silicon-containing materials is examined. These negative electrodes can absorb a large amount of lithium ion, and thus can significantly lower the potential at the negative electrode. Therefore, they can be effectively used for obtaining a battery with high capacity. In particular, much attention is paid to silicon-containing materials, whose lithium absorption amount is greater than that of graphite.

A higher capacity can be expected with a negative electrode including a silicon-containing material, since it absorbs a large amount of lithium ion during charge, thereby to lower the negative electrode potential. If, however, supply of non-aqueous electrolyte to the negative electrode becomes insufficient, the negative electrode potential will not be lowered sufficiently. This results in a low initial capacity of the battery, and thus in poor initial static characteristics of the battery. If the negative electrode potential is in such a state during continuous charge, at the negative electrode, a side reaction of the conductive agent included in the negative electrode with lithium and non-aqueous electrolyte becomes noticeable, the resistance is raised, and the battery capacity is reduced. In short, the continuous charge characteristics deteriorate, and thereby the reliability of the battery degrades. Patent Literature 1 teaches the use of niobium pentoxide doped with lithium in the negative electrode. The above-mentioned side reaction involving the conductive agent at the negative electrode, however, is particularly noticeable in a negative electrode including a silicon-containing material whose reduction potential is lower than niobium pentoxide, and the side reaction leads to poor initial static characteristics and deterioration in continuous charge characteristics.

In view of the problem as above, one aspect of the present invention intends to provide a non-aqueous electrolyte battery which includes a positive electrode including vanadium pentoxide, and a negative electrode including a silicon-containing material, and despite this, is excellent in initial static characteristics and continuous charge characteristics.

Solution to Problem

One aspect of the present invention relates to a non-aqueous electrolyte battery including a pellet-shaped positive electrode, a pellet-shaped negative electrode, a separator interposed between the positive electrode and the negative electrode, and a non-aqueous electrolyte. The positive electrode includes a positive electrode active material, aluminum powder, a conductive agent, and a binder. The positive electrode active material contains vanadium pentoxide. The positive electrode has a porosity of 35.6 to 45.4 vol %. The negative electrode includes a negative electrode active material containing silicon, a conductive agent, and a binder.

Advantageous Effects of Invention

According to the above aspect of the present invention, a non-aqueous electrolyte battery excellent in initial static characteristics and continuous charge characteristics can be obtained, although it includes a positive electrode including vanadium pentoxide, and a negative electrode including a silicon-containing material.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A schematic cross-sectional view of a coin lithium secondary battery according to one embodiment of a non-aqueous electrolyte battery of the present invention

DESCRIPTION OF EMBODIMENT

One aspect of the present invention relates to a non-aqueous electrolyte battery including a pellet-shaped positive electrode, a pellet-shaped negative electrode, a separator interposed between the positive and negative electrodes, and a non-aqueous electrolyte. In the non-aqueous electrolyte battery, the positive electrode includes a positive electrode active material, aluminum powder, a conductive agent, and a binder. The positive electrode active material contains vanadium pentoxide. The negative electrode includes a negative electrode active material containing silicon, a conductive agent, and a binder. In such a non-aqueous electrolyte battery, the porosity of the positive electrode is 35.6 to 45.4 vol %.

When a positive electrode is formed into a pellet shape using vanadium pentoxide as the positive electrode active material, because of its low packability as compared with other positive electrode active materials, the porosity of the positive electrode tends to increase. When the positive electrode is highly porous, the supply speed of non-aqueous electrolyte to the positive electrode becomes very fast, which in turn slows the supply speed to the negative electrode.

In general, in non-aqueous electrolyte batteries in which the negative electrode includes a negative electrode active material containing silicon, the absorption reaction of lithium ion into the negative electrode proceeds very quickly upon injection of non-aqueous electrolyte, in the process of battery fabrication (in the initial stage). In other words, when using a negative electrode including a silicon-containing negative electrode active material, the non-aqueous electrolyte is considerably consumed at the negative electrode in the initial stage.

When a positive electrode including vanadium pentoxide is used in combination with a negative electrode including a silicon-containing negative electrode active material, the battery reaction at the negative electrode needs a large amount of non-aqueous electrolyte in the initial stage. Despite such need, the supply of non-aqueous electrolyte to the negative electrode tends to be insufficient, because the positive electrode is likely to be highly porous. Insufficient supply of non-aqueous electrolyte to the negative electrode means insufficient absorption of lithium ion into the negative electrode, which hinders the lowering of negative electrode potential in the initial stage. Consequently, the initial static characteristics of the battery tend to be poor.

Moreover, when the battery is continuously charged while the negative electrode potential is not sufficiently lowered, at the negative electrode, the non-aqueous electrolyte is consumed not by a charge reaction of the silicon-containing negative electrode active material, but by a side reaction involving the conductive agent contained in the negative electrode and lithium. The side reaction is an irreversible reaction. Therefore, due to continuous charge, the capacity retention rate of the battery is reduced.

When niobium pentoxide as disclosed in Patent Literature 1 is used as the negative electrode active material, the above problem hardly occurs since the absorption reaction of lithium into negative electrode active material occurs preferentially to the above-mentioned side reaction involving the conductive agent at the negative electrode. When using a silicon-containing negative electrode active material, however, the above side reaction becomes extremely noticeable, and in association therewith, the initial static characteristics and continuous charge characteristics are significantly impaired. The reduction in initial static characteristics and continuous charge characteristics as mentioned above can be regarded as a problem specific to the combination of a negative electrode including a silicon-containing negative electrode active material and a positive electrode including vanadium pentoxide.

In one embodiment of the present invention, the porosity of the pellet-shaped positive electrode is controlled to 45.4 vol % or less. Therefore, even though the positive electrode active material contains vanadium pentoxide, the speed at which the non-aqueous electrolyte is absorbed into the positive electrode can be appropriately slowed, and thus the supply speed of non-aqueous electrolyte to the negative electrode is not unnecessarily slowed.

A lower porosity of the positive electrode is considered preferable because the absorption of non-aqueous electrolyte is slowed, and the supply of non-aqueous electrolyte to the negative electrode is unlikely to become insufficient. The present inventors have found, however, that when the porosity is too low, the battery capacity reduces during continuous charge. This is presumably for the following reasons. First, in the process of compressing a mixture (positive electrode material mixture) containing constituent components of the positive electrode into a pellet shape, an unnecessarily large load is applied to the constituent components. As a result, the particulate components (e.g., positive electrode active material and conductive agent) collapse, to reduce the conductivity of the positive electrode. Secondly, during continuous charge, the side reaction continuously proceeds at the negative electrode including silicon. This is combined with increases in internal resistance of the positive and negative electrodes, to impair the initial static characteristics of the battery. Thirdly, when the battery is charged continuously while the internal resistance thereof is high, the battery capacity cannot be fully utilized, and as a result, the capacity remaining rate after continuous charge is reduced. In view of the above, the porosity of the positive electrode should be set to 35.6 vol % or more.

As described above, in one embodiment of the present invention in which the porosity of the positive electrode is set to 35.6 to 45.4 vol %, despite the combination of a positive electrode including vanadium pentoxide with a negative electrode including a silicon-containing negative electrode active material, both the positive electrode and the negative electrode are allowed to retain an appropriate amount of non-aqueous electrolyte. It is therefore possible to suppress the reduction in initial battery static characteristics, as well as the reduction in capacity during continuous charge. Therefore, even when used for backup, the non-aqueous electrolyte battery can exhibit high reliability.

In the following, the configuration of the non-aqueous electrolyte battery will be more specifically described.

(Positive Electrode)

The pellet-shaped positive electrode has a porosity of 35.6 vol % or more, preferably 35.8 vol % or more, and more preferably 36 vol % or more. The porosity of the positive electrode is 45.4 vol % or less, preferably 45.2 vol % or less, and more preferably 45 vol % or less. These lower limits and upper limits can be combined in any combination. For example, the porosity may be 35.8 to 45.4 vol %, or 36 to 45 vol %.

When the porosity is above 45.4 vol %, the positive electrode absorbs non-aqueous electrolyte very fast, and therefore, non-aqueous electrolyte cannot be supplied to the negative electrode in an amount sufficient for the charge reaction. This results in an insufficient lowering of negative electrode potential during charge in the initial stage, and thus in poor initial static characteristics. Moreover, if the state continues in which the negative electrode potential is not lowered sufficiently, or continuous charge is performed in this state, the side reaction involving the conductive agent included in the negative electrode occurs at the negative electrode, and the battery capacity is reduced. That is, the continuous charge characteristics deteriorate.

When the porosity of the positive electrode is below 35.6 vol %, in the process of producing a pellet-shaped positive electrode, due to an application of an unnecessarily large load to the constituent components of the positive electrode, the particulate constituent components (e.g., conductive agent and active material particles) crush or collapse. This breaks the electrically conductive paths within the positive electrode, reducing the conductivity and increasing the resistance of the positive electrode in the initial stage. In other words, the internal resistance of the battery increases, and thus the initial static characteristics of the battery become poor. Furthermore, when the battery is charged continuously while the internal resistance thereof is high, the capacity retention rate is reduced. In other words, the continuous charge characteristics also deteriorate, which damages the long-term reliability of the battery.

The porosity of the positive electrode can be calculated from the mass, volume and real density of the positive electrode. The real density of the positive electrode can be calculated from the contents and specific gravities of the constituent components of the positive electrode.

The positive electrode active material is not particularly limited as long as it contains vanadium pentoxide, and may further contain a known component used as the positive electrode active material for non-aqueous electrolyte batteries, for example, sulfides such as $TiS_2$ and $MoS_2$; metal oxides such as $V_6O_{13}$ and $MnO_2$; and lithium-containing transition metal composite oxides such as lithium cobalt oxide, lithium nickel oxide, and lithium manganese oxide.

The vanadium pentoxide content in the positive electrode active material is, for example, desirably 70 mass % or more, and may be 80 mass % or more, or 90 mass % or more. The positive electrode active material may contain vanadium pentoxide only. Specifically, the vanadium pentoxide content in the positive electrode active material is 100 mass % or less. These lower limits and upper limits can be combined in any combination. By using a positive electrode active material containing vanadium pentoxide, a flat high-voltage profile can be readily obtained, and a battery with high capacity can be readily realized. The self-discharge of the battery is small, and an enhanced reliability can be readily achieved even when the battery is used for backup.

Vanadium pentoxide is usually in the form of particles. The average particle size of vanadium pentoxide is, for example, 1 to 30 μm, preferably 3 to 20 μm, and more preferably, 5 to 15 μm. The average particle size can be determined, for example, on the basis of a specific surface area calculated by an air permeability method.

By using aluminum powder in combination with vanadium pentoxide, the vanadium pentoxide is unlikely to be oxidized and leach out during overcharge. If an oxide of vanadium pentoxide leaches out, a surface film is formed on the negative electrode, to inhibit the charge and discharge reaction, which reduces the capacity. Although the reason is unclear, the addition of aluminum powder to the positive electrode is considered to permit the oxidation of aluminum to occur preferentially to the oxidation of vanadium pentoxide, even when the potential at the positive electrode becomes excessively high during overcharge. The oxide of aluminum thus produced exists stably within the positive electrode. Therefore, the addition of aluminum powder to the positive electrode can suppress the reduction in capacity during overcharge.

Although there is no limitation on the particle size of aluminum powder, the smaller the better so that aluminum powder can be readily oxidized during overcharge. For example, the percentage of particles having a particle size of 45 μm or less in the aluminum powder as measured by the Ro-tap method is preferably 60 mass % or more, and more preferably 70 mass % or more, or 80 mass % or more.

The amount of the aluminum powder included in the positive electrode is, for example, 1 to 20 parts by mass, preferably 1 to 10 parts by mass, and more preferably 1.5 to 8 parts by mass, relative to 100 parts by mass of the positive electrode active material. When the amount of aluminum powder is within the range as above, the reduction in battery capacity during overcharge can be more effectively suppressed.

The conductive agent included in the positive electrode may be any electrically conductive material that is stable (e.g., causes no chemical reaction) within the operating potential range during charge and discharge. Examples of the conductive agent include: graphites, such as natural graphite and artificial graphite; carbon blacks, such as acetylene black and Ketjen black; conductive fibers, such as carbon fibers and metal fibers; and fluorinated carbon. These conducive agents may be used singly or in combination of two or more. For ease of ensuring good conductivity at the positive electrode, it is preferable to use carbon blacks such as Ketjen black as the conductive agent.

The amount of conductive agent is, for example, 1 to 30 parts by mass, preferably 2 to 20 parts by mass, and more preferably 3 to 10 parts by mass, relative to 100 parts by mass of the positive electrode active material. When the amount of conductive agent is within the range as above, at the positive electrode, good conductivity can be easily ensured, and the increase in internal resistance in the initial stage can be easily suppressed.

Examples of the binder included in the positive electrode include: polyolefins, such as polyethylene and polypropylene; fluorocarbon resins, such as polytetrafluoroethylene, polyvinylidene fluoride, tetrafluoroethylene-hexafluoropropylene copolymer, and modified products thereof; rubbery polymers, such as styrene butadiene rubber and modified acrylonitrile rubber; and acrylic polymers, such as polyacrylic acid, acrylic acid-methacrylic acid copolymer, and salts thereof (e.g., sodium salts and ammonium salts). These binders can be used singly or in combination of two or more. Among these binders, for ease of ensuring the strength of the electrode, fluorocarbon resins such as tetrafluoroethylene-hexafluoropropylene copolymer are particularly preferred.

The amount of binder is, for example, 0.5 to 10 parts by mass, preferably 1 to 8 parts by mass, and more preferably 1.5 to 7 parts by mass, relative to 100 parts by mass of the positive electrode active material. When the amount of binder is within the range as above, good conductivity of the positive electrode can be easily ensured, while the strength thereof is ensured.

The positive electrode includes, as essential components, a positive electrode active material, aluminum powder, a conductive agent, and a binder. The positive electrode can be produced by preparing a mixture (material mixture) including these components, and compacting the material mixture into a pellet shape. By adjusting the pressure applied to the material mixture when compacted, the porosity can be adjusted. The compacting can be performed by, for example, packing the material mixture in a molding die of a predetermined shape, and applying pressure to the mixture. The material mixture compacted into a pellet shape may be dried by air or heat under reduced or atmospheric pressure. The porosity of the positive electrode can be indirectly controlled by adjusting the mass and volume of the pellet. The size of the positive electrode pellet (diameter, when the pellet is disk-like) is usually fixed. Therefore, by adjusting the mass and thickness, the pressure applied to the material mixture to be compressed can be adjusted, and a positive electrode pellet having a desired porosity can be obtained. The positive electrode may be provided with a known current collector, if necessary.

A dispersion medium may be used for dispersing the material mixture, if necessary. Examples of the dispersion medium include: water, alcohols such as ethanol, ethers such as tetrahydrofuran, amides such as dimethylformamide, N-methyl-2-pyrrolidone, and mixed solvents thereof. The binder may be used in the form of dispersion in which the binder is dispersed in the dispersion medium.

(Negative Electrode)

The negative electrode includes a negative electrode active material containing silicon (or a silicon-containing material), a conductive agent, and a binder.

Examples of the silicon-containing material include simple substance of silicon, silicon alloys, and silicon compounds (e.g., nitrides, sulfides, and oxides). These silicon-containing materials may be used singly or in combination of two or more. Preferred among them are silicon alloys and simple substance of silicon.

An example of the silicon alloys is an alloy of silicon and a transition metal.

In the silicon alloy, an electrochemically active amorphous silicon phase (amorphous Si phase) and an electrochemically inactive phase may coexist. The inactive phase functions to lessen the stress of expansion and contraction of the amorphous Si phase associated with charge and discharge, as well as to make the negative electrode active material electrically conductive. Such an electrochemically inactive phase includes an intermetallic compound of silicon and a transition metal element constituting the alloy. The amorphous Si phase sometimes includes very small crystallites, the size of which is, however, too small to be observed on X-ray diffraction spectra, and is, for example, 10 nm or less.

Examples of the transition metal element constituting the silicon alloy include: Group 4 elements in the periodic table such as Ti and Zr; Group 6 elements such as Cr, Mo and W; Group 7 elements such as Mn; Group 8 elements such as Fe; Group 9 elements such as Co; Group 10 elements such as Ni; and Group 11 elements such as Cu. The intermetallic compound may contain one or two transition metal elements. Preferable examples among them include Ti, Ni, W and Co. Specifically, a preferable silicon alloy is, for example, Si—Ti alloy, Si—Ni alloy, Si—W alloy, and Si—Co alloy. For ease of ensuring good conductivity, the negative electrode active material preferably includes Si—Ti alloy, and particularly preferably includes a Si-titanium alloy having an amorphous Si phase.

In the silicon alloy, the mass ratio of the silicon to the transition metal element (silicon:transition metal element) is, for example, 40:60 to 80:20, preferably 50:50 to 75:25, and more preferably 55:45 to 70:30. When the mass ratio of the silicon to the transition metal element is within the range as above, a high capacity of the battery can be easily ensured. In addition, stress associated with changes in volume of the active material during charge and discharge can be easily lessened, and good conductivity can be easily ensured. Note that the mass ratio of the silicon to the transition metal element can be considered equally to the mass ratio of the silicon to the transition metal used for forming an alloy.

The silicon alloy can be produced by any known method, such as mechanical alloying, vacuum vapor deposition, plating, gas-phase chemical reaction, liquid quenching, and ion beam sputtering.

The negative electrode active material may be doped with lithium in advance. Lithium doping can be accomplished by, for example, upon production of a pellet-shaped negative electrode (or negative electrode precursor) including a negative electrode active material, immersing the negative electrode precursor with lithium foil laminated thereon in non-aqueous electrolyte, to cause an electrochemical short circuit. Lithium doping is preferably performed in the process of battery fabrication, in view of suppressing the increase in internal resistance and the reduction in capacity of the negative electrode.

The conductive agent included in the negative electrode can be selected from those exemplified for the positive electrode, and is preferably a carbonaceous one. Among conductive agents, graphite is more preferred because of its low volume and good conductivity.

The amount of conductive agent is, for example, 15 to 45 parts by mass, preferably 18 to 42 parts by mass, and more preferably 20 to 40 parts by mass, relative to 100 parts by mass of the negative electrode active material. When the amount of conductive agent is within the range as above, good conductivity can be easily ensured, and the reduction in battery capacity can be more effectively suppressed even during continuous charge.

The binder included in the negative electrode can be selected from those exemplified for the positive electrode. For ease of obtaining high bonding and favorable battery characteristics, an acrylic polymer or a salt thereof is preferred. The acrylic polymer is, for example, a polymer which contains, as a monomer unit, at least one selected from acrylic acid and methacrylic acid. Specific examples of the acrylic polymer include: polyacrylic acid, poly methacrylic acid, acrylic acid-methacrylic acid copolymer, copolymers of acrylic acid and/or methacrylic acid with another copolymerizable monomer (e.g., olefine, acrylic acid ester, and methacrylic acid ester) such as ethylene-acrylic acid copolymer and acrylic acid-methyl acrylate copolymer, and salts thereof (e.g., alkali metal salts such as sodium salts; and ammonium salts). Preferred among them are polyacrylic acid.

The binders may be used singly or in combination of two or more. The binder may be used in the form of dispersion in which the binder is dispersed in a dispersion medium.

The amount of binder is, for example, 1 to 20 parts by mass, and preferably 5 to 15 parts by mass, relative to 100 parts by mass of the negative electrode active material.

The negative electrode includes, as essential components, a negative electrode active material containing silicon, a binder, and a conductive agent. Like the positive electrode, the negative electrode can be produced by preparing a mixture (material mixture) including these components, and compacting the material mixture into a pellet shape. The negative electrode may be provided with a known current collector, if necessary.

(Separator)

The pellet-shaped positive electrode and the pellet-shaped negative electrode are arranged so as to face each other with a separator interposed therebetween.

The separator may be, for example, in the form of woven or non-woven fabric, or a polyolefin microporous film.

Examples of a resin constituting the woven or non-woven fabric include: polyolefins, such as polypropylene; polyphenylene sulfides; aromatic polyamides, such as aramid; polyimide resins, such as polyimide and polyamide-imide; and polyether ether ketones. The woven or non-woven fabric may contain one or two or more of these resins. The polyolefin contained in the microporous film is, for example, polyethylene, polypropylene, or ethylene-propylene copolymer.

The separator may be of any shape and size, as long as it can electrically insulate the positive electrode from the negative electrode. For example, the separator used with disk-like positive and negative electrodes is of a circular shape having a size somewhat larger than each of the areas facing the positive electrode and the negative electrode.

The thickness of the separator can be selected as appropriate from the range of, for example, 10 to 250 μm.

(Non-Aqueous Electrolyte)

The non-aqueous electrolyte includes a non-aqueous solvent, and a lithium salt dissolving in the non-aqueous solvent. Any known non-aqueous solvent and lithium salt may be used without limitation.

Non-limiting examples of the non-aqueous solvent include: cyclic carbonates, such as ethylene carbonate (EC), propylene carbonate (PC), and butylene carbonate; chain carbonates, such as dimethyl carbonate, diethyl carbonate, and ethyl methyl carbonate; cyclic ethers, such as 1,4-dioxane, 1,3-dioxolane, tetrahydrofuran, 2-methyltetrahydrofuran, and 3-methyltetrahydrofuran; chain ethers, such as 1,2-dimethoxyethane (DME), 1,2-diethoxyethane, 1,3-dimethoxypropane, diethylene glycol dimethyl ether, and tetraglyme; lactones, such as γ-butyrolactone; and sulfoxide compounds, such as sulfolane. These non-aqueous solvents may be used singly or in combination of two or more.

Non-limiting examples of the lithium salt include: lithium salts of fluorine-containing acid imides, such as LiN$(CF_3SO_2)_2$, LiN$(C_2F_5SO_2)_2$, and LiN$(CF_3SO_2)(C_4F_9SO_2)$; lithium salts of fluorine-containing acids, such as LiPF$_6$, LiBF$_4$, and LiCF$_3$SO$_3$; and lithium salts of chlorine-containing acids, such as LiClO$_4$. These lithium salts may be used singly or in combination of two or more. The lithium salt concentration in the non-aqueous electrolyte is, for example, 0.5 to 2 mol/L.

The non-aqueous electrolyte may contain, if necessary, a known additive which is, for example, a carbonate having a polymerizable unsaturated bond, such as vinylene carbonate and vinylethylene carbonate, and an aromatic compound, such as cyclohexylbenzene and diphenyl ether.

The non-aqueous electrolyte may be a solution in which the lithium salt is dissolved in the non-aqueous solvent, or a gel in which the solution is retained in a polymeric material. Examples of the polymeric material include: fluorocarbon resins, such as polyvinylidene fluoride and vinylidene fluoride-hexafluoropropylene copolymer; chlorine-containing vinyl resins, such as polyvinyl chloride; vinyl cyanide resins, such as polyacrylonitrile; acrylic resins, such as polyacrylates; and polyalkylene oxides, such as polyethylene oxide. These polymeric materials may be used singly or in combination of two or more.

The non-aqueous electrolyte battery can be fabricated by, for example, placing pellet-shaped positive and negative electrodes, a separator interposed therebetween, and the non-aqueous electrolyte in a battery case, and sealing the case with a sealing plate. The fabrication method is not particularly limited, and any known method can be employed. To fabricate a coin non-aqueous electrolyte battery, for example, the positive electrode is placed in a battery case (on the inner bottom surface, for example), then the separator is placed on the positive electrode, and the non-aqueous electrolyte is injected into the case. Subsequently, a sealing plate with the negative electrode attached onto the inner surface thereof is fitted to the opening of the battery case via a gasket, thereby to seal the case. A coin lithium secondary battery can be thus obtained.

FIG. 1 is a schematic cross-sectional view of a coin lithium secondary battery according to one embodiment of the present invention.

A coin lithium secondary battery 10 includes a disk-like pellet of positive electrode 4, a disk-like pellet of negative electrode 5, a separator 6 interposed between the positive and negative electrodes 4 and 5, and a non-aqueous electrolyte (not shown). The positive electrode 4 includes a vanadium pentoxide-containing positive electrode active material, aluminum powder, a conductive agent, and a binder, and has a porosity of 35.6 to 45.4 vol %. The negative electrode 5 includes a silicon-containing negative electrode active material, a conductive agent, and a binder.

The separator 6 is resin nonwoven fabric or microporous film cut out into a circular shape. The positive electrode 4 and the negative electrode 5, which are electrically insulated from each other via the separator 6, are placed in a battery case 1 made of stainless steel, such that the positive electrode 4 comes in contact with the inner bottom surface of the battery case 1.

The battery case 1 is provided, on its inner side wall from the opening, with an ejection-molded ring-shaped gasket 3 made of resin (e.g., polypropylene). A portion at the opening upper end of the battery case 1 is curled inward by crimping, with the gasket 3 interposed between the portion and a sealing plate 2 made of stainless steel. The battery case 1 and the sealing plate 2 constitute a battery housing.

It is to be noted that the negative electrode may be doped with lithium in the process of battery fabrication. Specifically, lithium foil is laminated on a disk-like pellet of negative electrode (or negative electrode precursor) including a negative electrode active material, a conductive agent, and a binder. The negative electrode with lithium foil laminated thereon, a positive electrode, and a separator interposed therebetween are placed in a battery case, into which non-aqueous electrolyte is then injected. In that way, by electrochemically shorting the negative electrode precursor laminated with lithium foil by immersing it in the non-aqueous electrolyte, a negative electrode in which the negative electrode active material is doped with lithium can be obtained.

EXAMPLES

The present invention will now be specifically described with reference to Examples and Comparative Examples. It is to be noted, however, the present invention should not be construed as limited to the following Examples.

Example 1

A coin lithium secondary battery A1 as illustrated in FIG. 1 was fabricated in the manner described below.
(1) Preparation of Negative Electrode Precursor Ti—Si alloy was synthesized by mechanical alloying. Specifically, Ti and Si were placed in a mass ratio of 35:65 in a vibratory ball mill, together with 15-mm-diameter stainless steel balls. The atmosphere in the mill was replaced with argon, and maintained at 1 atm. Mechanical alloying was performed under these conditions for 80 hours, with the vibratory ball mill being driven at an amplitude of 8 mm and the number of revolutions of 1200 rpm. The resultant alloy powder was classified, to obtain alloy powder having a particle size of 50 µm or less as a negative electrode active material.

The negative electrode active material, graphite serving as a conductive agent, and polyacrylic acid serving as a binder were mixed in a solid content mass ratio of 100:30:10, to give a negative electrode material mixture. The negative electrode material mixture was formed into a disk-like pellet having a diameter of 7.0 mm and a thickness of 0.30 mm, and dried at 160° C. for 12 hours, to prepare a negative electrode precursor.

The binder used here was an aqueous solution of non-crosslinked polyacrylic acid having a weight average molecular weight of 1,000,000 (available from Toagosei Co., Ltd.). The conductive agent used here was graphite having an average particle size of 10 µm (available from Nippon Graphite Industries Ltd.).
(2) Production of Positive Electrode Vanadium pentoxide (average particle size as measured by air permeability method: 8 µm) serving as a positive electrode active material, Ketjen black serving as a conductive agent, an aqueous dispersion of a fluorocarbon resin serving as a binder, and aluminum powder were mixed in a solid content mass ratio of 87:7:3:3, to give a positive electrode material mixture. The positive electrode material mixture was compressed into a disk-like pellet having a diameter of 6.2 mm and a thickness of 1.09 mm, and dried at 200° C. for 10 hours, to form a positive electrode. The aluminum powder used here included particles having a size of 45 µm or less as measured by the Ro-tap method in an amount of 80 mass % or more.
(3) Fabrication of Battery A coin lithium secondary battery as illustrated in FIG. 1 was fabricated in the manner described hereinearlier.

In the battery fabrication, metal lithium foil was laminated on the negative electrode precursor prepared in (1), and the precursor laminated with lithium foil was electrochemically shorted within the battery by bringing it into contact with the non-aqueous electrolyte, thereby to allow Si in the precursor to be alloyed with lithium. The negative electrode was thus formed.

The battery had an outside diameter of 9.5 mm and an overall height of 2.0 mm. The battery fabricated through the above process was denoted as battery A1. In the manner similar to the above, 10 batteries A1 were fabricated in total.

The separator used here was a non-woven fabric made of polypropylene. The gasket used here was made of polypropylene. The non-aqueous electrolyte used here was prepared by dissolving $LiBF_4$ serving as a lithium salt in a PC:EC:DME=1:1:1 (volume ratio) mixed solvent serving as a non-aqueous solvent. The lithium salt concentration in the non-aqueous electrolyte was 1 mol/L. The amount of non-aqueous electrolyte injected into the battery was 45 µl.
(4) Evaluation The resultant batteries and the positive electrodes used for the batteries were evaluated for the following items (a) to (c).

(a) Porosity of Positive Electrode

The fabricated batteries were disassembled, and the positive electrodes were taken out, and then washed and dried. The mass and dimensions (volume) of each positive electrode were measured. The true density of each positive electrode was determined based on the specific gravities and amounts of constituent components of the positive electrode. From the mass, dimensions and true density thus determined, the porosity of the positive electrode was calculated.

(b) Evaluation of Series Resistance (IR)

The batteries upon fabrication were aged by heating at 45° C. for 72 hours. The series resistance (IR) of each battery after aging was measured, and an average of the measured values of 10 batteries was calculated. In the measurement, a series resistance across the positive terminal (positive electrode case of the battery) and the negative terminal (negative electrode sealing plate) was measured with a resistance meter by a sine wave AC method (1 kHz).

(c) Evaluation of Continuous Charge Characteristics

The batteries upon fabrication were aged by heating at 45° C. for 72 hours, and subsequently, charged at a constant voltage of 3.7 V for approximately 40 hours via a 510Ω resistance. The charged batteries were discharged via a 10 kΩ resistance until the battery voltage reached 2.0 V. The discharge capacity (initial discharge capacity) when the battery voltage reached 2.0 V was measured, and an average of the measured values of 10 batteries was calculated.

Subsequently, the batteries were continuously charged in a 60° C. atmosphere. The discharge capacity after continuous charge was measured in the same way as measuring the initial discharge capacity, and an average value was calculated. The continuous charge was performed by continuously applying a 3.7 V voltage for 100 days. The ratio (%) of the average value of the discharge capacity after continuous charge of the battery to that of the initial discharge capacity was calculated as a capacity remaining rate (or capacity retention rate) after continuous charge, which was used as an indicator of the continuous charge characteristics. The higher the capacity remaining rate is, the more excellent continuous charge characteristics it indicates.

Examples 2 and 3 and Comparative Examples 1 to 4

Positive electrodes were produced in the same manner as in Example 1, except that in (2) Production of positive electrode the porosity was adjusted by changing the thickness of the pellet. Batteries A2 to A7 were fabricated and evaluations were conducted in the same manner as in Example 1, except for using the positive electrodes thus produced. The thickness of the positive electrode pellet in each battery was adjusted as follows: 1.21 mm (battery A2), 1.19 mm (battery A3), 1.17 mm (battery A4), 1.01 mm (battery A5), 1.00 mm (battery A6), and 0.97 mm (battery A7).

The results of Examples and Comparative Examples are shown in Table 1. Here, batteries A1, A4 and A5 are of Examples, and batteries A2, A3, A6 and A7 are of Comparative Examples.

TABLE 1

| Battery | Porosity of positive electrode (vol %) | Series resistance (Ω) | Capacity remaining rate (%) |
|---|---|---|---|
| A2 | 47 | 33 | 11 |
| A3 | 46 | 32 | 21 |
| A4 | 45 | 30 | 70 |
| A1 | 41 | 32 | 69 |
| A5 | 36 | 29 | 70 |
| A6 | 35 | 90 | 18 |
| A7 | 34 | 134 | 9 |

Table 1 shows that batteries A1, A4 and A5 in which the porosity of the positive electrode was within the range of 35.6 to 45.4 vol % exhibited a very high capacity remaining rate even after continuous charge at 60° C. In addition, the initial series resistances of these batteries were low. This is presumably because the reduction in conductivity at the positive electrode in the initial stage was suppressed.

In contrast, in batteries A2 and A3 in which the porosity of the positive electrode was 46 vol % or more, the initial series resistance was low, but the capacity remaining rate after continuous charge was significantly reduced. Presumably, in these batteries, the positive electrode absorbed non-aqueous electrolyte very fast, which in turn caused insufficient supply of non-aqueous electrolyte to the negative electrode during charge. As a result, the charge reaction at the negative electrode failed to proceed sufficiently, and thus the negative electrode potential was not lowered sufficiently. If continuous charge is performed in such a state, the side reaction involving the conductive agent readily proceeds at the negative electrode. Presumably because of this, the battery capacity after continuous charge was significantly reduced.

In batteries A6 and A7, too, in which the porosity of the positive electrode was 35 vol % or less, the capacity remaining rate after continuous charge was significantly reduced. This is presumably because, in the process of forming a positive electrode pellet, the constituent components were subjected to an unnecessarily high pressure, and, due to the pressure, the constituent components in the particulate state collapsed, failing to obtain sufficient conductivity. Moreover, presumably, the battery was continuously charged while the internal resistance thereof was high, which resulted in a significant reduction in capacity.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The non-aqueous electrolyte battery according to one embodiment of the present invention is excellent in continuous charge characteristics. It is also excellent in initial static characteristics. In short, the non-aqueous electrolyte battery can stably exhibit excellent battery characteristics. Therefore, the non-aqueous electrolyte battery can be used as main power source or backup power source for various applications including small portable devices such as cellular phones and digital still cameras.

REFERENCE SIGNS LIST

1 Battery case
2 Sealing plate
3 Gasket
4 Positive electrode
5 Negative electrode
6 Separator
10 Coin lithium secondary battery

The invention claimed is:

1. A coin-type non-aqueous electrolyte battery comprising a pellet-shaped positive electrode, a pellet-shaped negative electrode, a separator interposed between the positive electrode and the negative electrode, and a non-aqueous electrolyte,
the positive electrode including a positive electrode active material, aluminum powder, a conductive agent, and a binder, the positive electrode active material containing vanadium pentoxide, the positive electrode having a porosity of 36 vol % to 45 vol %, and
the negative electrode including a negative electrode active material containing silicon, a conductive agent, and a binder.

2. The coin-type non-aqueous electrolyte battery according to claim 1, wherein the positive electrode includes the aluminum powder in an amount of 1 part by mass to 20 parts by mass, relative to 100 parts by mass of the positive electrode active material.

3. The coin-type non-aqueous electrolyte battery according to claim 1, wherein the negative electrode active material is at least one selected from the group consisting of silicon alloys and simple substance of silicon.

4. The coin-type non-aqueous electrolyte battery according to claim 1, wherein the negative electrode active material includes a silicon-titanium alloy having an amorphous silicon phase.

5. The coin-type non-aqueous electrolyte battery according to claim 1, wherein:

the positive electrode active material contains vanadium pentoxide in the form of particles, and the average particle size of vanadium pentoxide is 3 μm to 20 μm.

6. The coin-type non-aqueous electrolyte battery according to claim 1, wherein:

a percentage of particles having a particle size of 45 μm or less than 45 μm in the aluminum powder as measured by the Ro-tap method is 60 mass % or more.

7. The coin-type non-aqueous electrolyte battery according to claim 1, wherein the pellet-shaped positive electrode is formed by compacting in which a material mixture is packed in a molding die of a predetermined shape, and pressure is applied to the mixture, such that the positive electrode has a porosity of 36 vol % to 45 vol %.

* * * * *